United States Patent [19]

Arbrink

[11] Patent Number: 5,575,179
[45] Date of Patent: Nov. 19, 1996

[54] COMPACT GEAR

[75] Inventor: Richard Arbrink, Västerås, Sweden

[73] Assignee: Asea Brown Boveri AB, Västerås, Sweden

[21] Appl. No.: 464,740

[22] PCT Filed: Dec. 15, 1993

[86] PCT No.: PCT/SE93/01068

§ 371 Date: Jul. 10, 1995

§ 102(e) Date: Jul. 10, 1995

[87] PCT Pub. No.: WO94/15114

PCT Pub. Date: Jul. 7, 1994

[30] Foreign Application Priority Data

Dec. 23, 1992 [SE] Sweden ................... 9203888

[51] Int. Cl.⁶ ................... B25J 17/00; F16H 1/28
[52] U.S. Cl. ............... 74/490.03; 74/417; 74/490.05; 475/336; 901/26
[58] Field of Search ............... 74/417, 490.03, 74/490.05; 475/336; 901/26

[56] References Cited

U.S. PATENT DOCUMENTS

| | | | |
|---|---|---|---|
| 1,802,112 | 4/1931 | Henderson et al. | 74/417 |
| 2,376,900 | 5/1945 | Case | 475/336 |
| 4,047,448 | 9/1977 | Pardo et al. | 74/417 |
| 4,068,536 | 1/1978 | Stackhouse | 74/417 |
| 4,499,790 | 2/1985 | Helms | 74/417 X |

*Primary Examiner*—Allan D. Herrmann
*Attorney, Agent, or Firm*—Watson Cole Stevens Davis, P.L.L.C.

[57] ABSTRACT

A compact gear with a gear housing (1) and an outgoing main shaft (4) which is rotatable in relation to the gear housing (1). The gear housing (1) supports a motor (2) with a drive shaft (3) projecting into the gear housing (1). On the drive shaft (3) there are arranged a first larger (6) and a second smaller conical toothed wheel (7). Transversely through the main shaft (4) extends a cross shaft (9) which is rotatably journalled in the main shaft (4). On opposite sides of this cross shaft (9) two equally large first (13) and second (14) crown wheels are rotatably arranged on the main shaft (4). The crown wheels (13, 14) engage, on opposite sides, with a third conical toothed wheel (12) arranged on the cross shaft (9). A third crown wheel (18) with a larger diameter than the second crown wheel (14) is rotatably arranged around the main shaft and secured to the second crown wheel (14). The second smaller conical toothed wheel (7) engages with the first crown wheel (13) and the first larger conical toothed wheel (6) with the third crown wheel (18). The gear ratio between the second conical toothed wheel (7) and the first crown wheel (13) is different from the gear ratio between the first conical toothed wheel (6) and the third crown wheel (18).

4 Claims, 2 Drawing Sheets

FIG. 3
FIG. 2
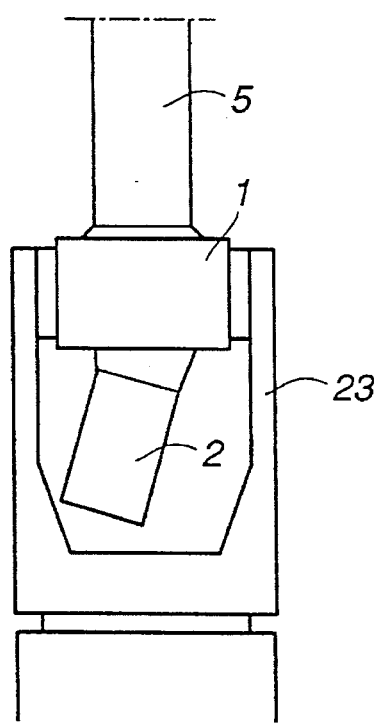
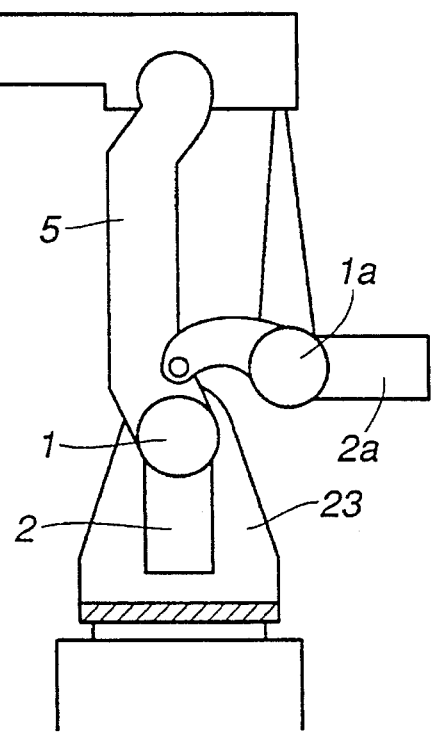

COMPACT GEAR

TECHNICAL FIELD

The present invention relates to a differential-type compact gear. It is designed to achieve, within a small space, a high gear ratio between an ingoing drive shaft and an outgoing main shaft which is rotatable between two end positions. The gear is especially suited for use with industrial robots.

BACKGROUND ART

To achieve high gear ratios in the range of between 1:50 and 1:150 or higher, gear units with many toothed wheels or other types of relatively space-demanding gear means are normally required. In many kinds of operation where only a small space is available, for example in articulated robot arms, this is an awkward drawback. The present invention relates to a gear unit which is built into a small space around the outgoing main shaft of the gear.

From U.S. Pat. No. 1,802,112, a differential-type reduction gear is previously known, by means of which very high gear ratios can be obtained. A drawback of this gear is that it comprises eight toothed wheels, which entails a high production cost and a large space requirement.

SUMMARY OF THE INVENTION

The invention relates to a compact gear comprising a gear housing and an outgoing main shaft which is rotatable in relation to the gear housing. The gear housing supports a motor with a drive shaft projecting into the gear housing. On the drive shaft there are arranged a first larger and a second smaller conical toothed wheel as well as a cross shaft, extending transversely through the main shaft and rotatably journalled in the main shaft. On each side of this cross shaft, two equally large first and second crown wheels are rotatably mounted on the main shaft and adapted to engage, on opposite sides, with a third conical toothed wheel mounted on the cross shaft. A third crown wheel with larger diameter than the second crown wheel is rotatably arranged around the main shaft and secured to the second crown wheel. The invention is characterized in that the drive shaft is arranged so as to form an angle with a normal plane of the main shaft, that the above-mentioned second smaller conical toothed wheel is arranged in engagement with the first crown wheel whereas the first larger conical toothed wheel in a known manner is arranged in engagement with the third crown wheel. The gear ratio between the second conical toothed wheel and the first crown wheel is different from the gear ratio between the first conical toothed wheel and the third crown wheel.

The invention provides a compact gear with few intermediate shafts since the outgoing main shaft at the same time constitutes the shaft of the crown wheels. The gear ratio between the ingoing drive shaft and the outgoing main shaft becomes greater the smaller the difference in speed of rotation is between the first and second crown wheels. This in turn means that the smaller the difference in gear ratio between the second conical toothed wheel and the first crown wheel in relation to the gear ratio between the first conical toothed wheel and the third crown wheel, the greater is the total gear ratio of the gear. Gear ratios up to and above 1:150 can be obtained in connection with the gear sizes which occur in, for example, robots.

BRIEF DESCRIPTION OF THE DRAWINGS

FIG. 2 is a schematic view of a robot with a compact gear. One leg of the robot stand is cut away in order to show the compact gear with the motor.

FIG. 3 is a detailed view of the same robot seen from the side with both legs of the stand in place.

DESCRIPTION OF THE PREFERRED EMBODIMENTS

Figure 1:
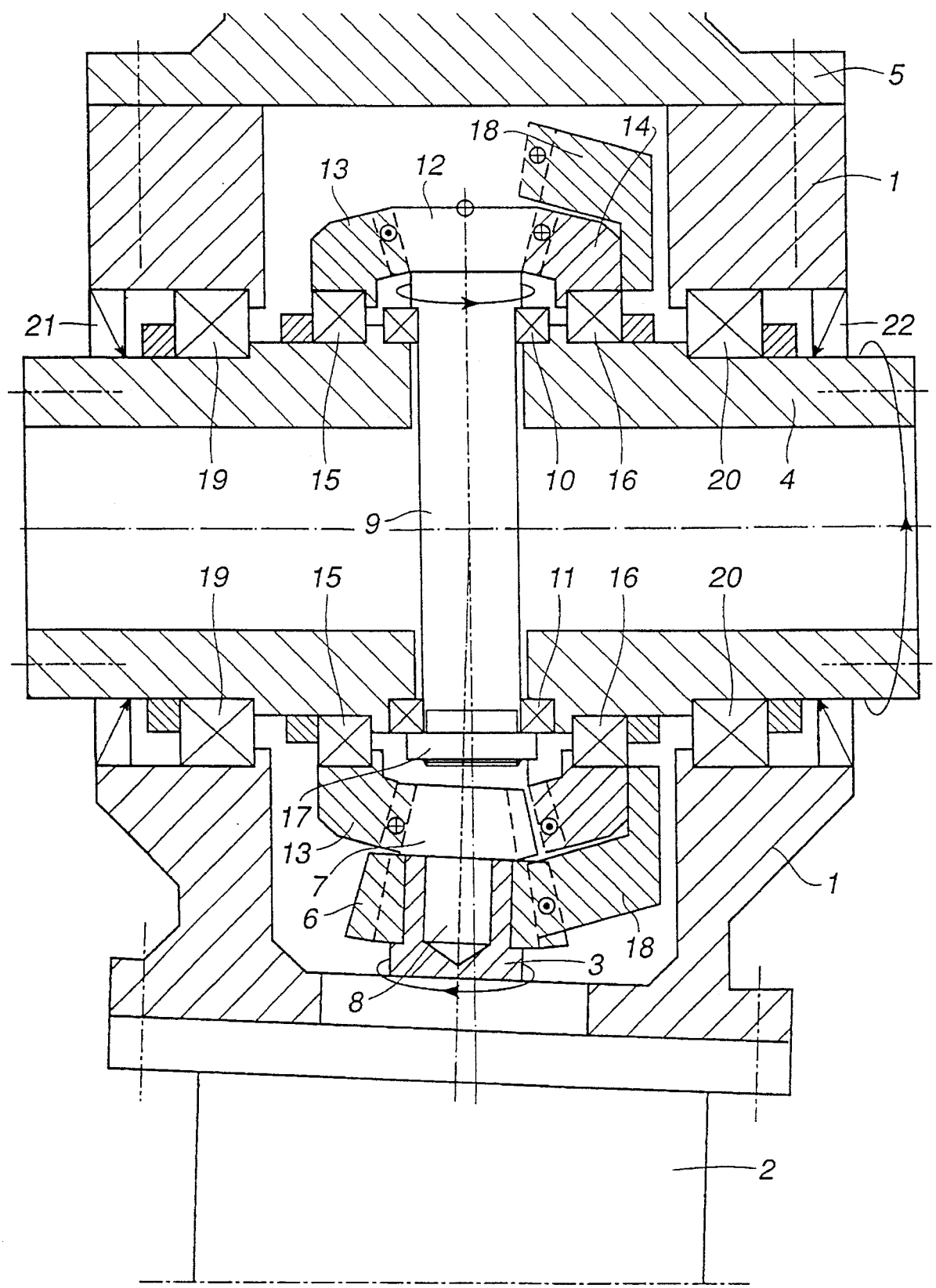
FIG. 1 shows a cross section of the gear housing with toothed wheels enclosed therein.

In FIG. 1, 1 designates the gear housing and 2 a drive motor with adjustable speed up to about 3500 r.p.m. The motor 2 has a drive shaft 3 which projects into the gear housing 1. A main shaft 4 extends right through the gear housing 1. In the embodiment this main shaft is made so thick as to be able to support the gear housing 1, the motor 2 and a robot arm 5 mounted on the gear housing. On the drive shaft 3 of the motor 2 a first larger conical toothed wheel 6 and a second smaller conical toothed wheel 7 are secured by press fit. The first larger toothed wheel 6 is pressed onto the outside of the drive shaft 3 whereas the second smaller toothed wheel 7 is provided with a shaft 8 of its own, which is pressed into a hole in the drive shaft 3. Thus, the drive shaft 3 is subjected to an internal and an external press fit. This is an advantage since it reduces the elongation of the shaft material in the radial direction.

Transversely through the main shaft 4 there extends a rotatable cross shaft 9 which is journalled in the main shaft 4 by means of the bearings 10 and 11. The cross shaft 9 is provided with a third conical toothed wheel 12. On each side of the cross shaft 9, two equally large first and second crown wheels 13, 14 are rotatably arranged on the main shaft 4. They are journalled in the bearings 15, 16. The crown wheels 13, 14 engage with the third toothed wheel 12. The play between these toothed wheel is controlled by means of a nut 17 on the cross shaft 9. By tightening this nut 17, the cross shaft 9 is displaced downwards in FIG. 1, whereby, as a result of the conicity of the toothed wheels, any play between them is reduced.

On the crown wheel 14, a larger third crown wheel 18 is secured. The first crown wheel 13 engages with the second conical toothed wheel 7 and the third crown wheel 18 engages with the first conical toothed wheel 6. If the gear ratio between the crown wheel 13 and the toothed wheel 7, that is, the number of teeth on the crown wheel 13 by the number of teeth on the toothed wheel 7, is somewhat greater than the gear ratio between the crown wheel 18 and the toothed wheel 6, that is, the number of teeth on the crown wheel 18 by the number of teeth on the toothed wheel 6, then the crown wheel 18 and hence the crown wheel 14 will rotate somewhat faster than the crown wheel 13 and, of course, in a direction opposite to the latter. If the directions of rotation of the drive shaft 3 and the toothed wheels are those mentioned in FIG. 1 and the gear housing 1 is secured, the cross shaft 9 will be accompanied by the crown wheel 14 in its direction of rotation, that is, the third conical toothed wheel 12 moves inwardly in FIG. 1 and, viewed from the right in FIG. 1, the main shaft 4 will rotate in a clockwise direction. If, on the other hand, the main shaft 4 is secured in a robot stand, the gear housing 1, the motor 2, and the robot arm 5 will, viewed from the same direction, rotate in a counterclockwise direction around the main shaft 4. This main shaft 4 is journalled in the gear housing 1 by means of the bearings 19, 20, the gear housing being suitably filled with oil. The main shaft 4 is sealed by means of stuffing boxes 21 and 21 against the gear housing 1.

If, for example, the number of teeth on the toothed wheel 6 is chosen equal to $Z_{p1}=9$ and on the toothed wheel 7 equal to $Z_{p2}=9$ and on the crown wheels 13 and 14 equal to $Z_{k1}=Z_{k2}=40$ and the crown wheel 18 equal to $Z_{k3}=38$, the gear ratio between the crown wheel 13 and the toothed wheel 7 will be equal to $$U_1 = \frac{Z_{k1}}{Z_{p2}} = \frac{40}{9} = 4.444$$

The gear ratio between the crown wheel 18 and the toothed wheel 6 will be $$U_2 = \frac{Z_{k3}}{Z_{p1}} = \frac{38}{9} = 4.222$$

If the drive shaft 3 rotates one revolution, this means that the crown wheel 13 rotates $$\frac{9}{40} = 0.2250 \text{ revolutions} \quad (1)$$

and the crown wheel 18, that is, also the crown wheel 14, $$\frac{9}{38} = 0.2368 \text{ revolutions} \quad (2)$$

The resultant difference in revolutions between the crown wheels 13 and 14 will be $$0.2368 - 0.2250 = 0.0118$$

To obtain those parts of a revolution $V_h$ which the cross shaft 9 thus forces the main shaft 4 to rotate, the fact that the crown wheels 13, 14 move in opposite directions must be taken into consideration, that is, $$V_h = \frac{0.0118}{2} = 0.0059 \text{ revolutions}$$

When the drive shaft 3 moves one revolution, the main shaft 4 thus moves −0.0059 revolutions with the stated number of teeth. This corresponds to a gear ratio of 1/0.0059=169.

To give an idea of the size of the toothed wheels in this example, the following values are chosen:

Diameter of toothed wheel 7=27 mm
Diameter of toothed wheel 6=36 mm
Diameter of crown wheels 13, 14=120 mm
Diameter of crown wheel 18=152 mm FIG. 2 shows a robot with a stand 23, one leg of which has been cut away so as to show the gear housing 1 with the motor 2. On the gear housing 1, a robot arm 5 is also mounted. The main shaft 4 (not shown) is in this case secured in the stand 23, which means that when operating the drive shaft of the motor 2, the gear housing 1 with the motor 2 and the robot arm 5 move about the main shaft 4 and hence in relation to the stand 23. The upper rotor arm 24 is controlled with a number of links and suitably an additional compact gear with a gear housing 1a and a motor 2a. As will be clear from FIG. 2, the motor 2 serves as a counter-weight to the robot arm 5, which is an additional advantage of the invention.

FIG. 3 shows FIG. 2 seen from the side with the stand 23, the robot arm 5 and the gear housing 1 with the motor 2.

By uniting the toothed wheels 6 and 7 to the drive shaft 3 by means of two oppositely directed press fits, as mentioned above, a great transmitting torque can be obtained between the drive shaft and these toothed wheels. The drive shaft will also be subjected to a small deflection since it is loaded by opposite tooth loads from the toothed wheels 6 and 7. An additional advantage is that the toothed wheel 12 arranged on the cross shaft 9 transmits the driving moment to the main shaft 4 from two sets of teeth, namely, the teeth of the two crown wheels 13, 14.

The compact gear has one drawback in that the main shaft 4 cannot rotate one full revolution since the conical toothed wheel 7 will then knock against the conical toothed wheel 12 of the cross shaft 9. For robot arms and certain lifting devices, however, a rotation of the main shaft 4 about 300° is fully sufficient.

I claim:

1. A compact gear comprising a gear housing (1), an outgoing main shaft (4) which is rotatable in relation to the gear housing (1), a motor (2) supported by the gear housing (1) with a drive shaft (3) projecting into the gear housing 1, on which drive shaft a first larger (6) and a second smaller conical gear toothed wheel (7) are arranged, a cross shaft (9) directed transversely to the main shaft (4) and fixed to the main shaft, two equally large first (13) and second crown wheels (14) mounted on opposite sides of said cross shaft (9), said crown wheels (13, 14) being rotatably arranged on the main shaft (4) and adapted, on opposite sides, to engage with a third conical toothed wheel (12), arranged on the cross shaft (9), a third crown wheel (18) with a larger diameter than said second crown wheel (14) being rotatably arranged around the main shaft (4) and fixed to the second crown wheel (14), the first larger conical toothed wheel (6) being in engagement with the third crown wheel (18), characterized in that the drive shaft (3) is arranged so as to form an angle with a normal plane of the main shaft, that said second smaller conical toothed wheel (7) is in engagement with said first crown wheel (13), and that the gear ratio between the second conical toothed wheel (7) and the first crown wheel (13) is different from the gear ratio between the first conical toothed wheel (6) and the third crown wheel (18).

2. A compact gear according to claim 1, characterized in that the main shaft (4) is fixed in a robot stand (23) and that a robot arm (5) is arranged on the gear housing (1) such that the gear housing (1), the motor (2) and the robot arm (5) together are rotatable around the main shaft (4).

3. A compact gear according to claim 2, characterized in that the robot arm (5) and the motor (2) are arranged on opposite sides of the gear housing (1) such that the motor (2) constitutes a counterweight to the robot arm (5).

4. A compact gear according to claim 1, characterized in that the cross shaft (9) extends transversely through the main shaft and is rotatably journalled therein.

* * * * *